United States Patent [19]

Sakumoto et al.

[11] Patent Number: 5,132,614
[45] Date of Patent: Jul. 21, 1992

[54] SEMICONDUCTOR DEVICE AND METHOD AND APPARATUS FOR TESTING THE SAME

[75] Inventors: Aiichiro Sakumoto, Chigasaki; Akira Masuko; Ken Yamamoto, both of Tokyo, all of Japan

[73] Assignee: Kabushiki Kaisha Toshiba, Kawasaki, Japan

[21] Appl. No.: 560,177

[22] Filed: Jul. 31, 1990

[30] Foreign Application Priority Data

Aug. 3, 1989 [JP] Japan .................................. 1-201853
Aug. 23, 1989 [JP] Japan .................................. 1-216595

[51] Int. Cl.⁵ .......................................... G01H 31/28
[52] U.S. Cl. .............................. 324/158 R; 324/73.1; 371/22.6
[58] Field of Search ............... 324/158 R, 158 F, 73.1; 307/241, 243, 303; 371/22.1, 15.1, 22.5, 22.6, 22.3; 328/104, 154; 357/68, 42

[56] References Cited

U.S. PATENT DOCUMENTS

| | | | |
|---|---|---|---|
| 3,838,296 | 9/1974 | McLeod | 328/104 |
| 4,446,390 | 5/1984 | Alaspa | 307/243 |
| 4,490,673 | 12/1984 | Blum et al. | 324/158 R |
| 4,746,856 | 5/1988 | Allred, Jr. et al. | 324/158 R |
| 5,019,772 | 5/1991 | Dreibelris et al. | 324/158 R |

Primary Examiner—Vinh Nguyen
Attorney, Agent, or Firm—Finnegan, Henderson, Farabow, Garrett and Dunner

[57] ABSTRACT

A semiconductor device in which a semiconductor chip has a plurality of output terminals which are connected to a common node outside of the chip itself and are arranged into at least one group. A selection circuit disposed within the semiconductor selects one output terminal from among the output terminals in the group and allows data to be supplied only to the selected terminal. After testing, the output terminals are disconnected from one another to allow the chip to function properly.

9 Claims, 8 Drawing Sheets

SEMICONDUCTOR DEVICE AND METHOD AND APPARATUS FOR TESTING THE SAME

BACKGROUND OF THE INVENTION

1. Field of the Invention

The present invention relates to an improved semiconductor device having multiple output terminals, and an improved method and apparatus for testing the same.

2. Description of the Related Art

An LSI tester is generally used for a test such as a selection of LSIs. In conventional techniques, in order to test an LSI, the tester must have terminals corresponding to the number of terminals of an LSI. When the number of terminals of the tester is less than that of the LSI, the LSI can be tested by banding terminals to be tested (terminals of an LSI) and using a relay or the like.

Figure 1:
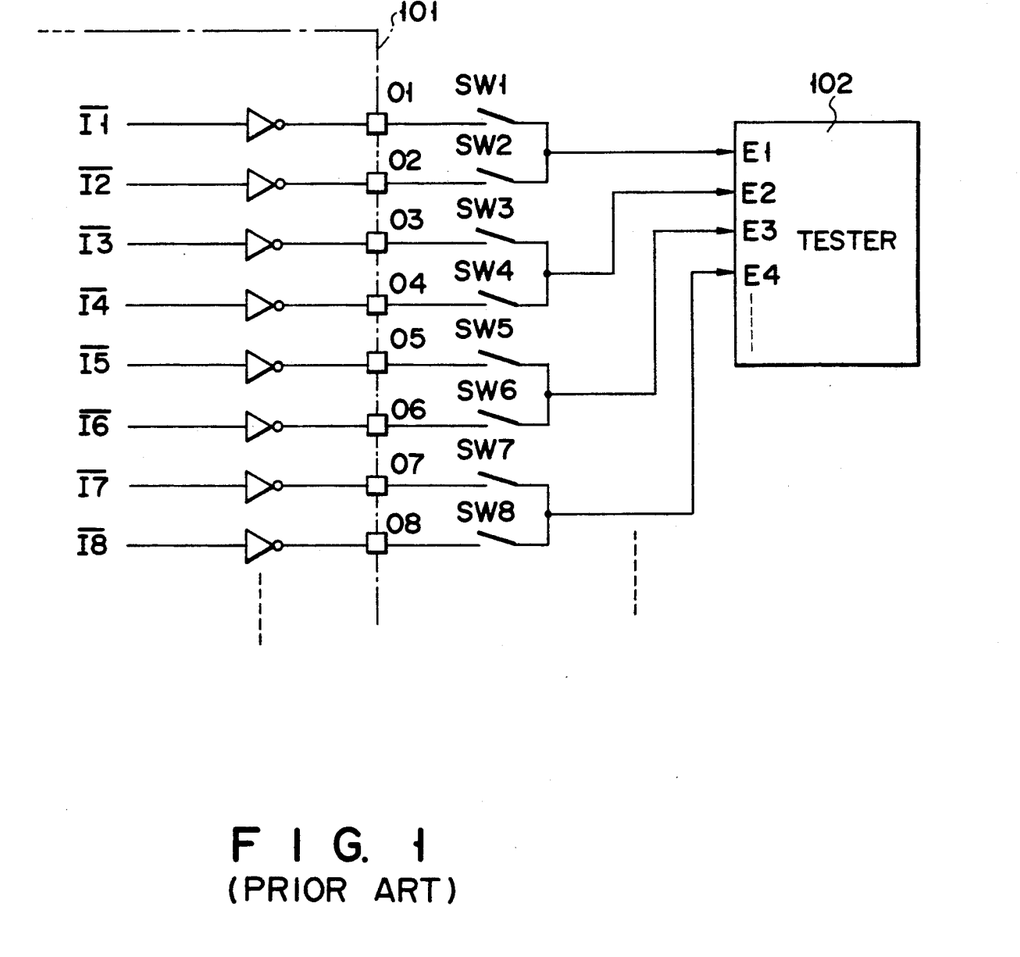
FIG. 1 is a circuit diagram showing a basic structure for performing a conventional method of testing a semiconductor device.

FIG. 1 shows, as a conventional method for testing, a basic structure for testing an LSI by banding the terminals to be tested using a relay. In FIG. 1, reference numeral 101 denotes an LSI; and 102, a tester. Reference symbols $\bar{I}_n$ ($n = 1, 2, \ldots$) denote inverted signals of data output to output terminals; $SW_n$ ($n = 1, 2, \ldots$), relays inserted between the LSI and the tester; $O_n$ ($n = 1, 2, \ldots$), output terminals of the LSI; and $E_n$ ($n = 1, 2, \ldots$), signals supplied to the tester.

Each pair of outputs $O_n$ of the LSI 101 are commonly connected through a corresponding one of the relays $SW_n$, and each common connecting point is connected to a corresponding one of the measuring terminals of the tester 102. For this reason, the LSI 101 having output terminals, the number of which is larger than the number of measuring terminals of the tester 102, can be tested. All the output terminals $O_n$ can be tested by switching the relays. At this time, the signal $E_m$ ($m = 1, 2, \ldots$) supplied to the tester 102 corresponds to $I_{(2m-1)}$ when the relay $SW_{(2m-1)}$ is set in an ON state and the relay $SW_{2m}$ is set in an OFF state. When the relay $SW_{(2m-1)}$ is set in an OFF state and the relay $SW_{2m}$ is set in an ON state, the signal $E_m$ corresponds to $I_{2m}$.

However, along with the advance of semiconductor techniques, an LSI is highly integrated, and an increase in number of terminals of the LSI is conspicuous. On the other hand, the development of a tester for testing the above LSI cannot cope with an increase in the number of terminals of the LSI, and a large-sized device is required. For this reason, the production cost is increased. As described above, when a test is performed by using a relay or the like and banding the terminals to be measured, depending on the increase of terminals in the LSI, the number of measuring terminals of the tester is increased, the capacity of a relay and the characteristics and reliability of the test are degraded, and wirings are complicated.

SUMMARY OF THE INVENTION

The present invention has been made to solve the above problem posed by an increase in number of terminals of the LSI, and has as its object to provide a semiconductor device capable of testing an LSI having a large number of output terminals even if a tester has a small number of measuring terminals, and a method and apparatus for testing the same.

In order to achieve the above object, according to the present invention, there is provided a semiconductor device comprising a semiconductor chip having data lines and output terminals respectively connected to the data lines, and a connecting means for commonly connecting an arbitrary number of output terminals of the output terminals.

A testing apparatus for the semiconductor device according to the present invention including a semiconductor chip having data lines and output terminals respectively connecting the data lines and a connecting means for commonly connecting an arbitrary number of output terminals of the output terminals, comprises a control means for controlling the device to enable a data line connected to one output terminal and disable data lines connecting to the other output terminals, and a measuring means for measuring data output from the enabled data line.

According to the present invention, there is provided a testing method wherein arbitrary output terminals are commonly connected, the commonly connected point is connected to a measuring terminal of a testing apparatus, one of data lines respectively connected to the arbitrary number of output terminals is enabled and other data lines are disabled, and data output from the enabled data line is measured by the testing apparatus.

DETAILED DESCRIPTION OF THE PREFERRED EMBODIMENTS

The first embodiment of the present invention will be described below with respect to the accompanying drawings. The same reference numerals throughout the drawings denote the same parts, and a detailed description thereof will be omitted.

Figure 2:
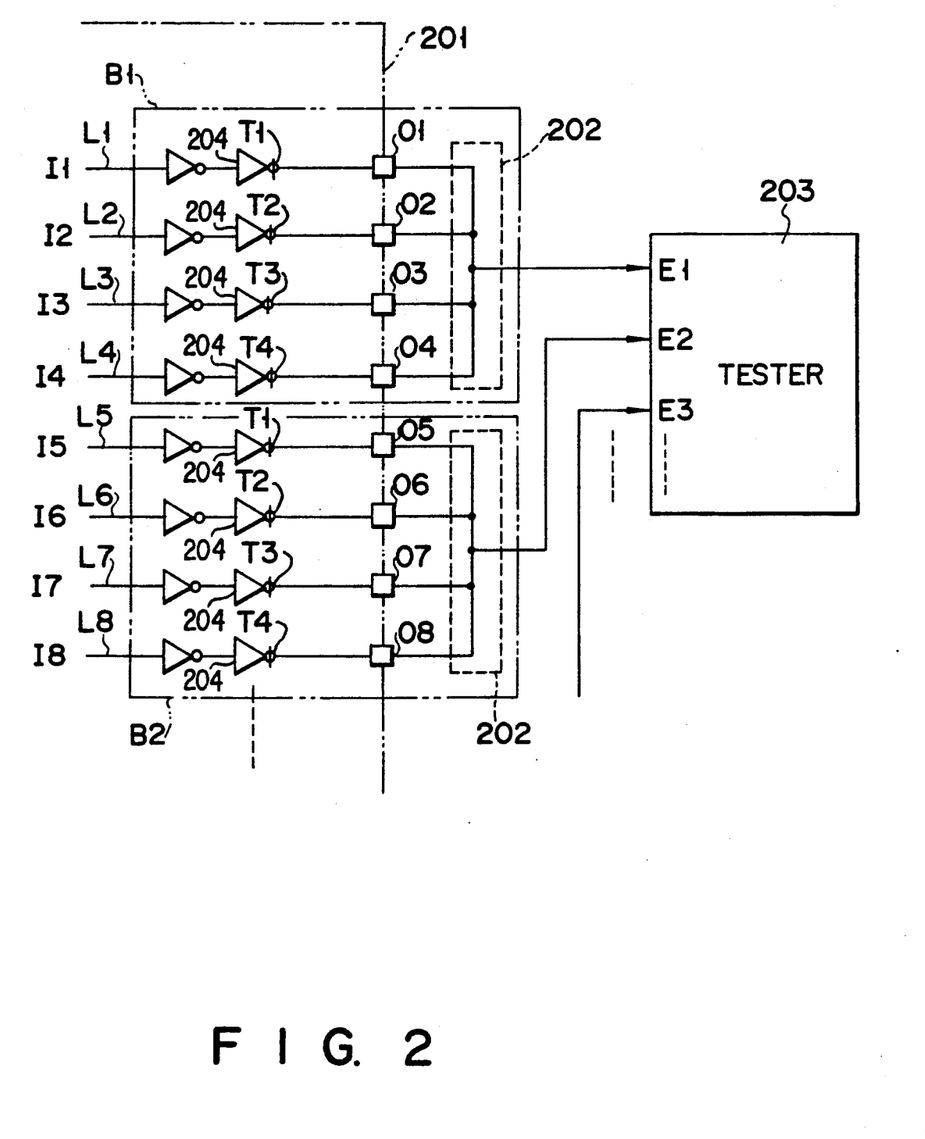
FIG. 2 is a circuit, diagram showing a basic structure for performing a method of testing a semiconductor device according to the present invention.

FIG. 2 shows a basic arrangement which embodies a method of testing a semiconductor device according to the first embodiment of the present invention. In FIG. 2, reference numeral 201 denotes an LSI; 202, a connecting means; 203, a tester (a measuring means); and 204, a clocked inverter. Reference symbols $I_n$ ($n = 1, 2, \ldots$) denote data output to output terminals; $L_n$ ($n = 1, 2, \ldots$), data output lines; $T_1$ to $T_4$, select signals; $O_n$ ($n = 1, 2, \ldots$), output terminals of an LSI; and $E_n$ ($n = 1, 2, \ldots$), signals supplied to the tester, respectively.

The output terminals $O_1$ to $O_4$ are commonly connected by the connecting means 202 outside the LSI 201, thereby constituting a first block $B_1$. The common connecting point is connected to a predetermined measuring terminal of the tester 203. The select signal(s) $T_1$ to $T_4$ are supplied from, e.g., the control means (not shown) of the tester 203 to the clocked inverters 204. In response to the select signal(s) $T_1$ to $T_4$, one of the data output lines $L_1$ to $L_4$ is enabled, and other output lines are disabled by the clocked inverters 204.

The output terminals $O_5$ to $O_8$ are commonly connected by the connecting means 202 outside the LSI 201, thereby constituting a second block $B_2$. The connecting point is connected to a predetermined measuring terminal of the tester 203. The control signals $T_1$ to $T_4$ supplied from the tester 203 and are input to the clocked inverter 204. In response to the select signal(s) $T_1$ to $T_4$, one of the data output lines $L_5$ to $L_8$ is enabled and other data output lines are disabled by the clocked inverter 204.

In the third and subsequent blocks (not shown), four output terminals are commonly connected by the corresponding connecting means, thereby constituting a block. The common connecting point is connected to a predetermined measuring terminal of the tester 203.

In a single block, two or more data output lines are not simultaneously enabled in response to the select signal(s) $T_1$ to $T_4$. The control signals $T_1$ to $T_4$ may be supplied from the outside of the LSI, or may be generated in the LSI.

Figure 3:
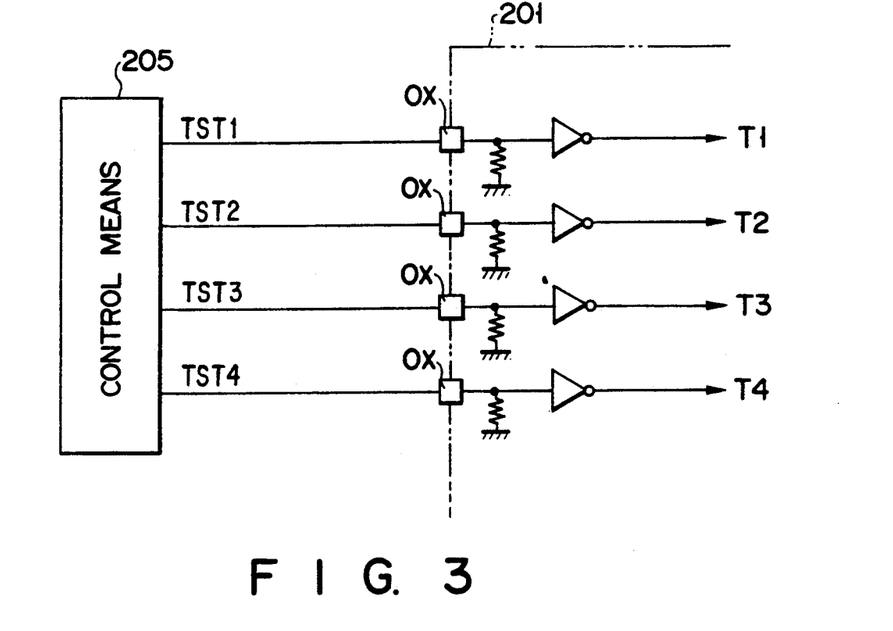
FIGS. 3 to 5 are circuit diagrams respectively showing arrangements for supplying control signals, respectively.

The select signals $T_1$ to $T_4$ can be supplied by, e.g., an arrangement shown in FIG. 3. In FIG. 3, reference numeral 205 denotes a control means, and it is provided in the tester 203. Reference symbols $O_x$ denote input terminals. Note that, in use of an LSI, all control signals $TST_1$ to $TST_4$ are set at "L (Low)" level.

Figure 4:
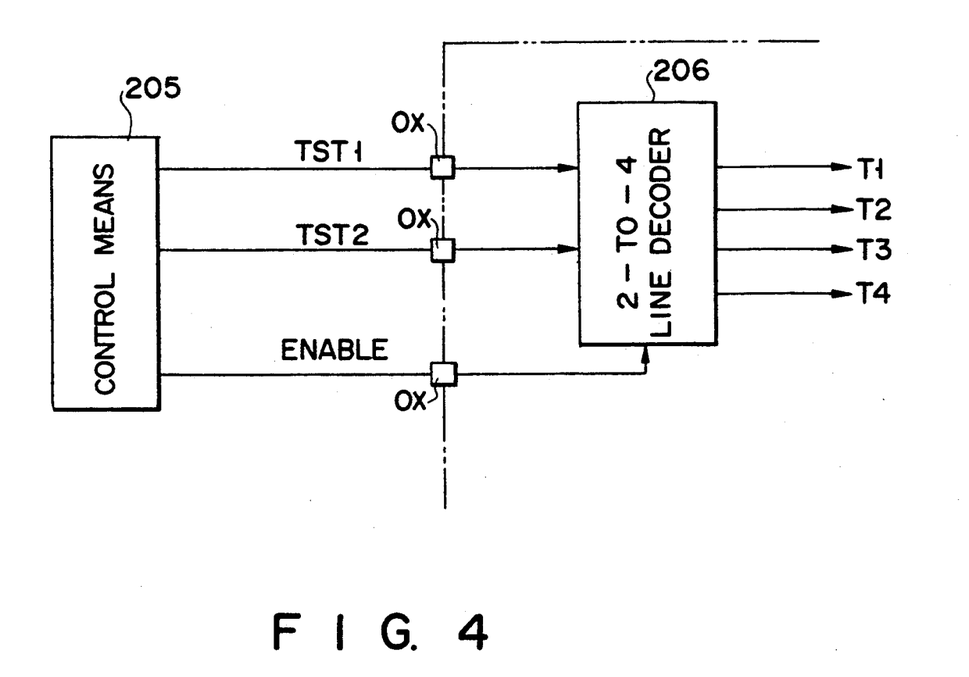

In addition, the select signal(s) $T_1$ to $T_4$ can be supplied by an arrangement shown in FIG. 4. In FIG. 4, reference numeral 206 denotes a line decoder.

According to the above arrangement, the select signal(s) $T_1$ to $T_4$ can be supplied by an operation shown in the following truth table. That is, during testing, an enable signal ENABLE is kept at "L" level. The select signal(s) $T_1$ to $T_4$ can be obtained by inputting two control signals $TST_1$ and $TST_2$ from the control means 205 to the line decoder 206. Note that, in use of an LSI, the enable signal ENABLE is set at "H (High)" level.

According to the above arrangement, since the number of input terminals for control signals can be decreased as compared with the arrangement in FIG. 3, the arrangement in FIG. 4 is further effective.

| ENABLE | $TST_1$ | $TST_2$ | $T_1$ | $T_2$ | $T_3$ | $T_4$ |
|---|---|---|---|---|---|---|
| H | X | X | H | H | H | H |
| L | L | L | H | L | L | L |
| L | H | L | L | H | L | L |
| L | L | H | L | L | H | L |
| L | H | H | L | L | L | H |

X: Don't care

Figure 5:
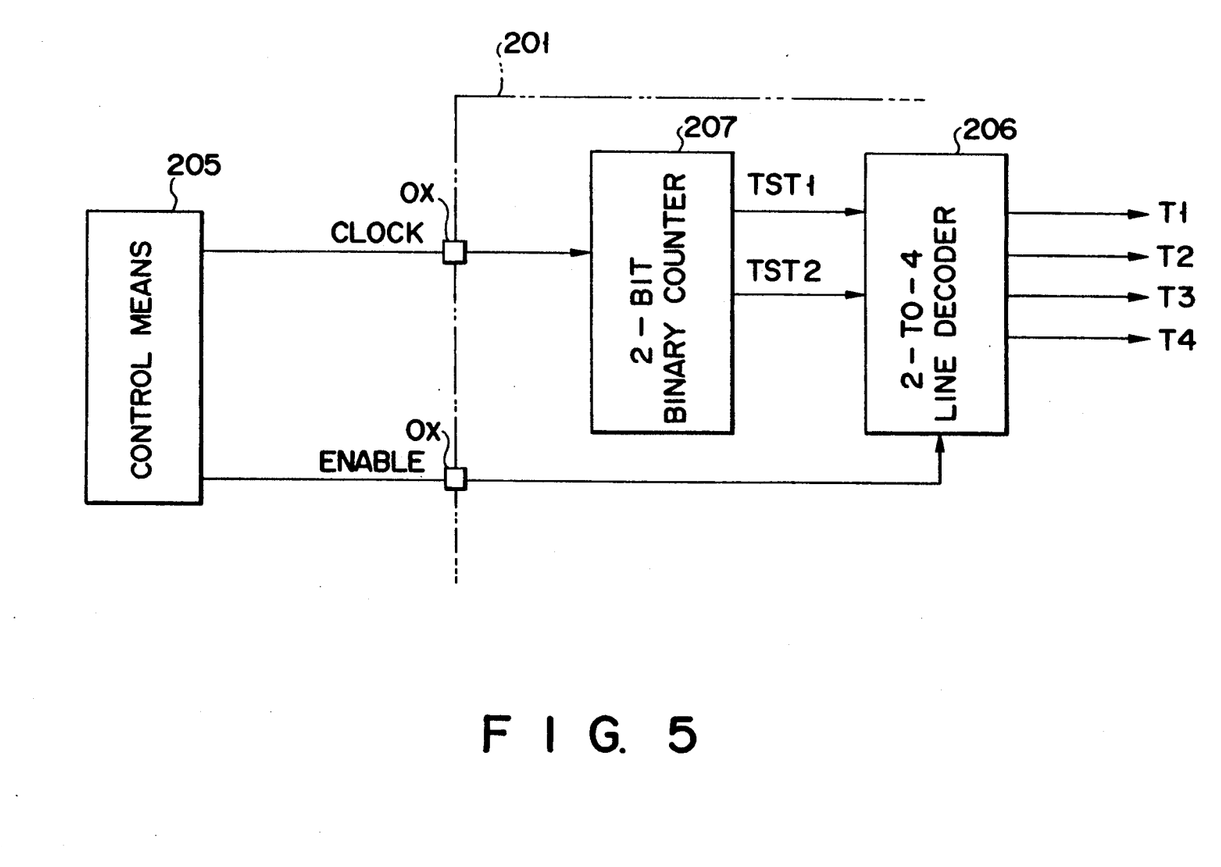

In order to produce the select signal(s) $T_1$ to $T_4$, an arrangement shown in FIG. 5 can be employed.

A clock signal CLOCK is output from the control means 205, and the clock signal CLOCK is input to a binary counter 207. Two control signals $TST_1$ and $TST_2$ are output from the binary counter 207, and the control signals $TST_1$ and $TST_2$ are input to the line decoder 206. Thus, the select signal(s) $T_1$ to $T_4$ are obtained from the line decoder 206.

As described above, according to this embodiment, the four output terminals are commonly connected to the connecting means 202, thereby constituting one block. In response to the select signal(s) $T_1$ to $T_4$, one of the data output lines connected to the four output terminals is enabled, and other data output lines are disabled. That is, data output lines to be enabled are sequentially changed, and all the output terminals can be tested. For this reason, an LSI having a large number of output terminals can be tested by a tester having a small number of measuring terminals.

Figure 6:
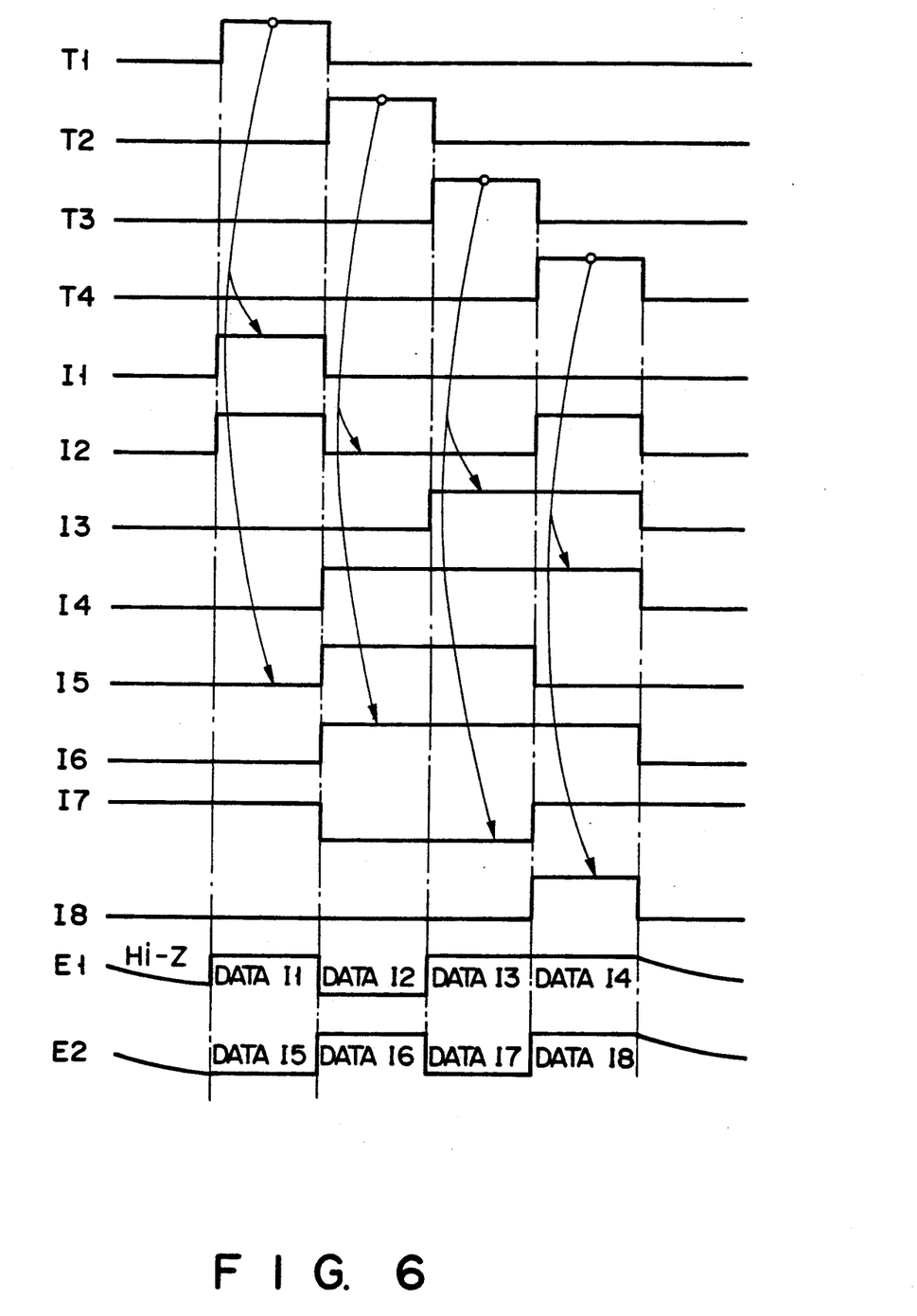
FIG. 6 is a timing chart showing signals according to a semiconductor testing method of the present invention.

FIG. 6 is a timing chart showing signals according to a method of testing a semiconductor device of the present invention. A method of testing a semiconductor device according to the present invention will be described with reference to FIGS. 2 and 6 below.

The select signal(s) $T_1$ is set at "H" level to enable the data output line $L_1$. The select signals $T_2$ to $T_4$ are set at "L" level to disable the data output lines $L_2$ to $L_4$. At this time, data $I_1$ is applied from a first block $B_1$ to the tester 203 to test functional and electric characteristics of the output terminal $O_1$. Note that a path from the output terminals $O_2$ to $O_4$ to the inside of the LSI 201 is set in a high impedance state. Input data $I_5$ is applied from the second block $B_2$ to the tester 203 to test functional and electric characteristics of the output terminal $O_5$. Note that a path from the output terminals $O_6$ to $O_8$ to the inside of the LSI 201 is set in a high impedance state. In addition, from the third block, any one of output terminals selected in the blocks by the select signal(s) $T_1$ is tested.

The select signal(s) $T_2$ is set at "H" level to enable the data output line $L_2$, and the select signal(s) $T_1$, $T_3$, and $T_4$ are set at "L" level to disable the data output lines $L_1$, $L_3$, and $L_4$. At this time, data $I_2$ is applied from the first block $B_1$ to the tester 203, thereby testing functional and electric characteristics of the output terminal $O_2$. Note that a path from the output terminals $O_1$, $O_3$, and $O_4$ to the inside of the LSI 201 is set in a high impedance state Input data $I_6$ is applied from the second block $B_2$ to the tester 203, thereby testing functional and electric characteristics of the output terminal $O_6$. Note that a path from the output terminals $O_5$, $O_7$, and $O_8$ to the inside of the LSI 201 is set in a high impedance state. In addition, from the third block, any one of output terminals selected in the blocks by the select signal(s) $T_2$ is tested.

Like the above signals, the select signal(s) $T_3$ and $T_4$ are set at "H" level to test any one of output terminals selected in the block by the control signal $T_3$ or $T_4$.

As described above, according to this embodiment, four output terminals respectively controlled by the select signal(s) $T_1$ to $T_4$ constitute one block. Among output terminals in one block, a data output line connected to a terminal to be measured is enabled, and data output lines connected to other terminals in this block are disabled. In this state, testing is performed. For this reason, the number of measuring terminals of the tester 203 is about ¼ the number of output terminals of an LSI to be tested.

In this embodiment, four output terminals respectively controlled by the select signal(s) $T_1$ to $T_4$ constitute one block. However, the present invention is not limited to this embodiment, and the number of terminals of one block can be set in accordance with the number of measuring terminals of a tester. For example, five output terminals may constitute one block using five select signal(s) $T_1$ to $T_5$, and five or more output terminals may constitute one block. However, a control signal does not simultaneously enable two or more data output terminals in one block.

Figure 7:
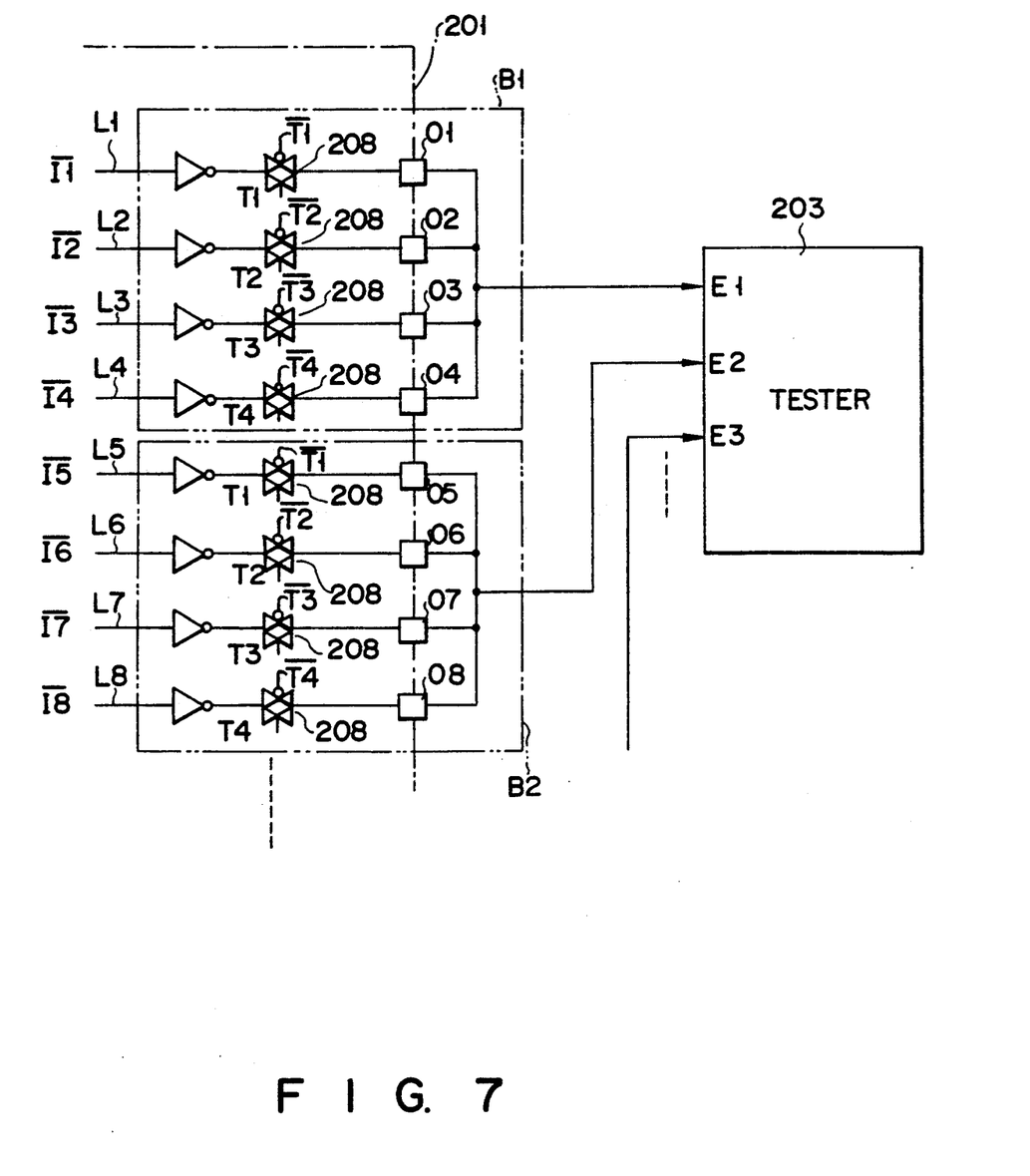
FIG. 7 is a view showing a basic arrangement which embodies a method of testing a semiconductor device according to the second embodiment of the present invention.

FIG. 7 shows a basic arrangement which embodies a method of testing a semiconductor device according to the second embodiment of the present invention.

In this embodiment, in place of the clocked inverter 204 used in the embodiment shown in FIG. 2, a transmission gate 208 is used.

Figure 8:
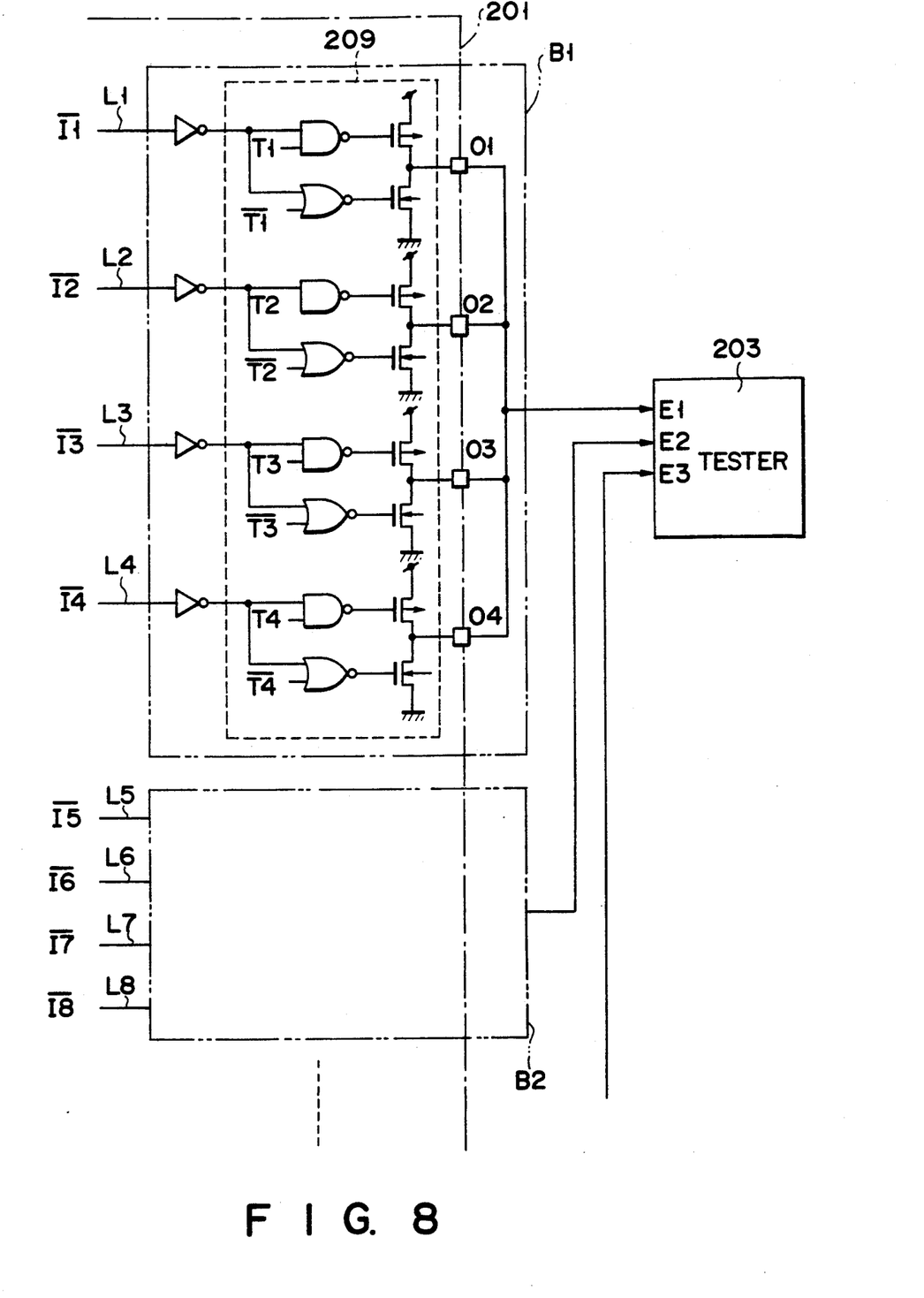
FIG. 8 is a view showing a basic arrangement which embodies a method of testing a semiconductor device according to the third embodiment of the present invention.

FIG. 8 shows a basic arrangement which embodies a method of testing a semiconductor device according to the third embodiment of the present invention.

In this embodiment, in place of the clocked inverter used in the embodiment shown in FIG. 2, a tri-state logic circuit 209 is used.

In any case using the transmission gate 208 or the tri-state logic circuit 209, testing is performed by enabling/disabling the data lines $L_1$ to $L_4$ as in the first embodiment.

Figure 9:
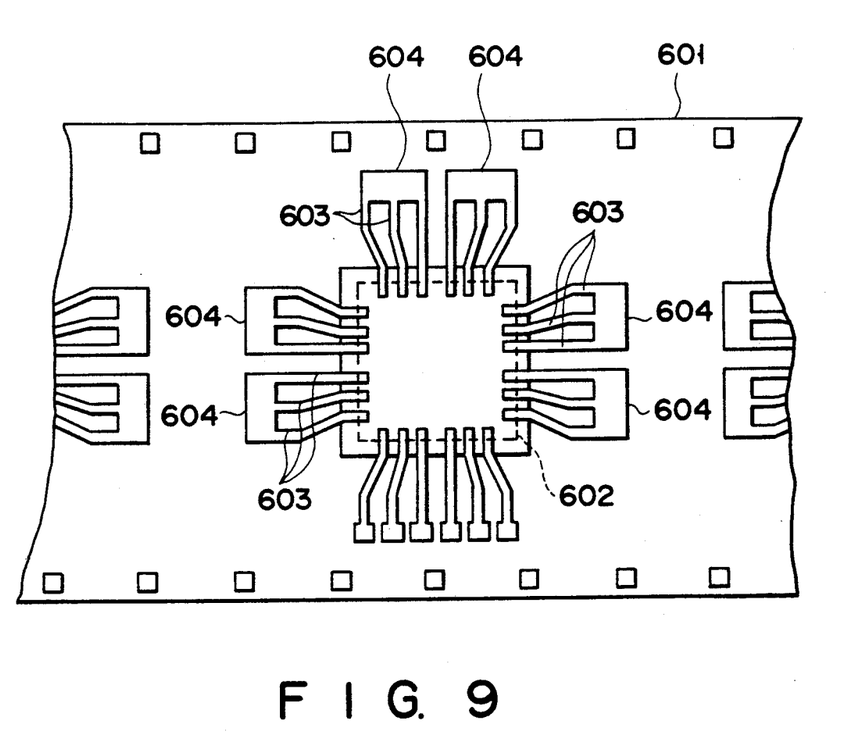
FIG. 9 is a plan view showing a structure of a connecting means.

The connecting means 202 for commonly connecting a plurality of output terminals $O_n$ to form one block can be obtained by directly connecting the plurality of output terminals $O_n$ to the measuring terminals of the tester or by using a structure shown in FIG. 9.

More particularly, as shown in FIG. 9, in a semiconductor device in which an LSI chip (semiconductor chip) 602 is arranged on a film carrier tape 601, a plurality of lead terminals 603 wired on the film carrier tape 601 are connected with each other, thereby providing one test electrode 604. Thus, one block is constituted by the plurality of lead terminals 603 which are connected to each other.

Figure 10:
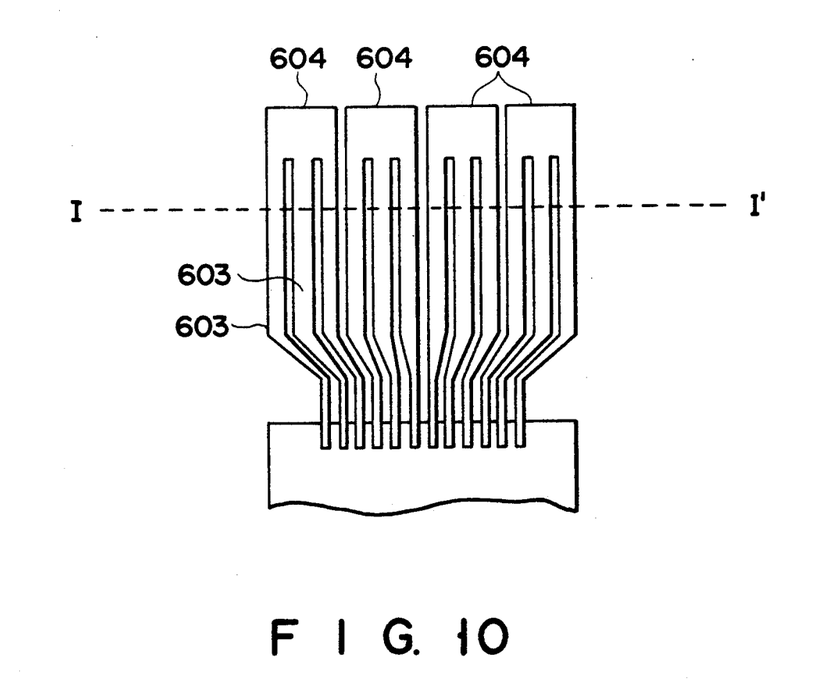
FIG. 10 is a view showing the connecting means in FIG. 9 in detail.

When an LSI which is tested is used in a practical operation, no problem is posed, if connections of output terminals of each block are cut along a line I—I', and if the select signal(s) $T_1$ to $T_4$ are set at "H" level, as shown in FIG. 10.

The present invention is not limited to the above embodiments described in this specification and the accompanying drawings, and various changes and modifications may be made within the spirit and scope of the invention, and the appended claims.

What is claimed is:

1. A semiconductor device comprising:
   a semiconductor chip having a plurality of output terminals;
   connecting means, disposed outside the semiconductor chip, for arranging the output terminals into at least one group and connecting the output terminals of said at least one group to a common node adapted for connection to a testing means, wherein said connecting means is removable from said semiconductor chip; and
   a selection circuit, disposed within the semiconductor chip, for selecting and enabling only one output terminal from among the output terminals of said at least one group for allowing data to be supplied only to the selected output terminal.

2. A semiconductor device according to claim 1, wherein said selection circuit comprises at least one clocked inverter.

3. A semiconductor device according to claim 1, wherein said selection circuit comprises at least one transmission gate.

4. A semiconductor device according to claim 1, wherein said selection circuit comprises at least one tri-state logic circuit.

5. A semiconductor device comprising:
   a semiconductor chip having a plurality of output terminals;
   connecting means, disposed outside the semiconductor chip, for arranging the output terminals into at least one group and connecting the output terminals of said at least one group to a common node adapted for connection to a testing means, wherein said connecting means includes a film carrier tape and a lead wire formed on the film carrier tape for connecting the output terminals of said group to a common node; and
   a selection circuit, disposed within the semiconductor chip, for selecting and enabling only one output terminal from among the output terminals of said at least one group for allowing data to be supplied only to the selected output terminal.

6. A method for testing a semiconductor chip having a plurality of output terminals, comprising the steps of:
   internally arranging the output terminals of said semiconductor chip into at least one group of output terminals and electrically connecting the output terminals of said at least one group to each other at a common node disposed outside the semiconductor chip for testing;
   selecting and enabling only one output terminal for testing from among the output terminals of said at least one group;
   outputting data from the semiconductor chip through the selected output terminal;
   measuring the data output through the selected output terminal;
   repeating said selecting, outputting, and measuring steps for each output terminal in said at least one group; and
   electrically disconnecting the output terminals of said at least one group from each other.

7. A method for testing a semiconductor chip according to claim 6, wherein said step of electrically disconnecting the output terminals from each other includes severing the output terminals of said at least one group from said common node.

8. A method for testing a semiconductor device according to claim 6, wherein said step of electrically disconnecting the output terminals includes severing the output terminals of said group from said common node.

9. A method for testing a semiconductor device having a plurality of output terminals, comprising the steps of:
   arranging the output terminals of the semiconductor device into at least one group of output terminals;
   electrically connecting the output terminals of said at least one group to each other at a common node disposed outside the semiconductor device;
   generating a control signal in a tester and supplying said control signal to said semiconductor device;
   selecting and enabling, through means disposed within the semiconductor device, only one output terminal from among the output terminals of said at least one group according to said control signal;
   outputting data from the semiconductor chip through the selected output terminal;
   measuring the data output through the selected output terminal with said tester; and
   repeating said steps of selecting, outputting, and measuring for each output terminal in said at least one group; and
   electrically disconnecting the output terminals of said at least one group from each other.

* * * * *